Patented Mar. 1, 1938

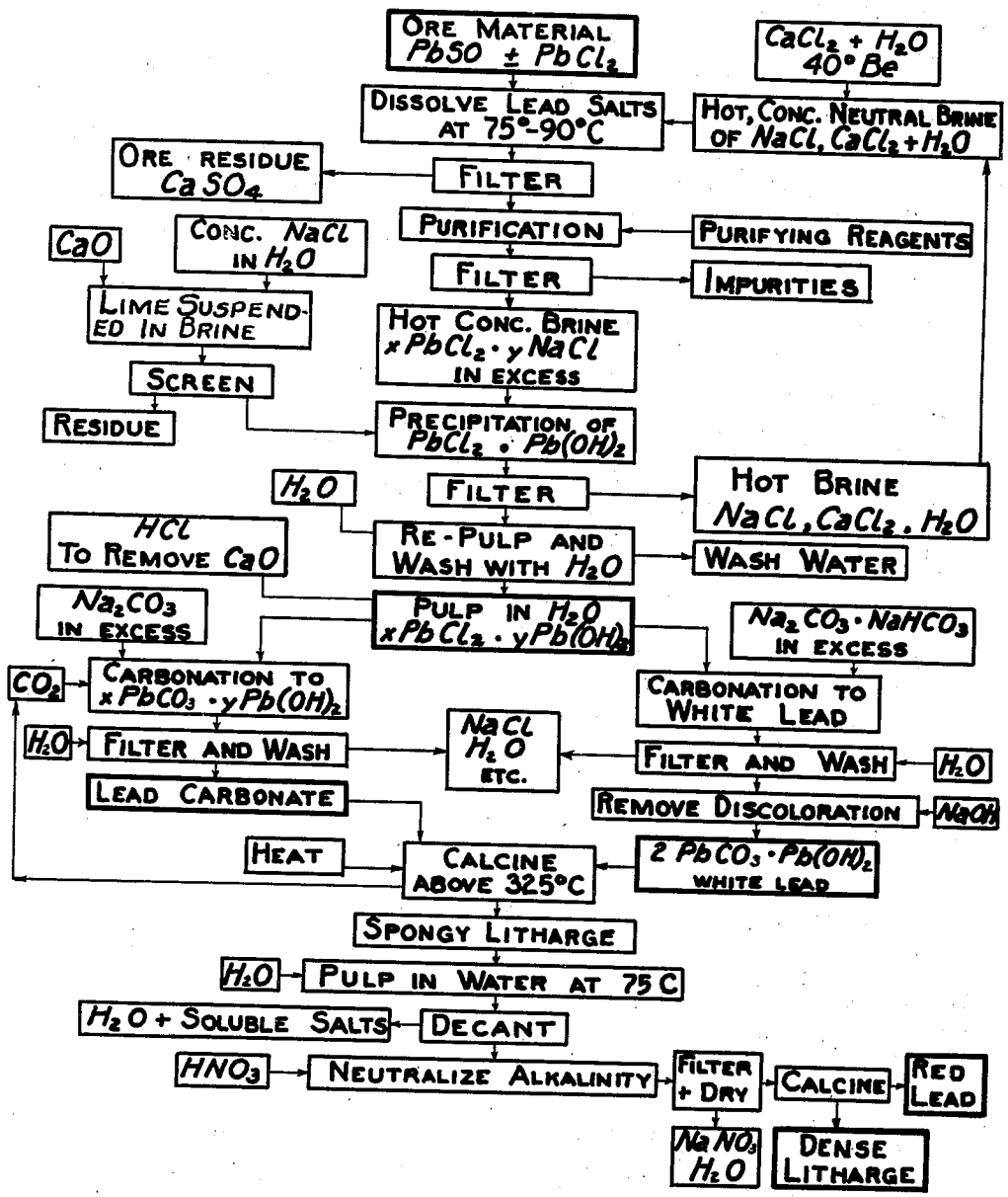

2,109,755

UNITED STATES PATENT OFFICE 2,109,755

METHOD OF MAKING LEAD COMPOUNDS

Royal L. Sessions, Los Angeles, Calif., assignor to Hughes-Mitchell Processes, Incorporated, Denver, Colo., a corporation of Wyoming Application December 9, 1935, Serial No. 53,577

13 Claims. (Cl. 23—69)

This invention relates to the manufacture of lead compounds, and particularly to the production of lead hydroxychloride, lead carbonate and lead hydroxycarbonate of required purity and physical characteristics.

Lead is commonly found as a sulfide in complex ores. By a roasting operation, the lead may be converted to lead sulfate and, after other metal values have been removed, the lead sulfate may be dissolved from the ore residue by means of a hot sodium chloride brine which leaves sodium sulfate in solution. Thereafter, the lead may be precipitated from the brine by suitable reagents comprising the hydroxyl and carbonate ions. It is found, however, that chlorine as derived from the brine as well as reagent salts tend to remain entrapped in the precipitated product and so make it difficult to produce a litharge of a sufficient purity for use in batteries and other desired purposes. Moreover, the presence of the sodium sulfate in the brine materially reduces its solvent action and so produces a solution of low concentration of lead ions which cannot be economically treated.

An efficient process requires that the brine be maintained hot, concentrated and purified from not only the sodium sulfate but also other ingredients which would be detrimental to the process. Moreover, the lead should be precipitated from the brine solution by such reagents and procedure as will prevent any detrimental occlusion thereof in the precipitate. The undesired metals in solution, such as iron and zinc, must not be precipitated with the lead carbonate. Also, satisfactory washing conditions should be maintained which permit removal of soluble salts but do not cause dilution of the salt brine nor waste of the lead values.

It is, accordingly, the primary object of this invention to satisfy these various conditions and to provide a process for the manufacture of the lead carbonates, including lead hydroxycarbonate and white lead, and the various lead oxides, which is economical and efficient and will give products of desired purity and physical characteristics. Other objects will be readily apparent in the following disclosure.

The drawing shows as a flow diagram the principal features of the preferred processes involved in making the lead carbonates and in forming the oxides therefrom, but the invention is not to be construed as limited to the exact steps there shown, except as defined by the claims appended hereto.

Assuming that the original ore contains lead, zinc and iron sulfides, such an ore may be roasted under oxidizing conditions to form lead sulfate and zinc and iron oxides and thereafter treated by suitable procedure, such as chloridizing or acid leaching steps, for solubilizing and removing the zinc content of the ore but leaving the lead in the form of lead sulfate, with or without lead chloride, interspersed through the ore residue. The iron is preferably left in the form of ferric oxide which is insoluble in the lead leaching brine. These lead salts may now be removed from the ore residue by means of a hot and preferably concentrated aqueous solution of alkali metal chloride, such as sodium or potassium chloride.

This step of solubilizing the lead requires consideration of many factors. The temperature of the brine solution should be sufficiently high for dissolving a large amount of lead. While it may be varied widely, yet it is preferably held between 75° and 90° C. Other preferred conditions are that the solution be a purified, neutral, 90% saturated aqueous brine of alkaline metal chloride, such as sodium chloride. That is, the brine should be purified from iron, manganese, silver, cadmium and other elements which will precipitate with and detrimentally contaminate the lead precipitate. It is neutral and not acidic so as to avoid dissolving iron from the ore material. Also, an alkaline condition would precipitate lead. The salt brine is preferably held unsaturated at its temperature of use, since a saturated brine is very difficult to handle because of the tendency for salt to crystallize out and create undesired effects. Also, by maintaining the brine temperature at about 75° C., it is possible to obtain a substantially saturated solution of the lead salt and then later raise the temperature of the solution through a few degrees to render it unsaturated at the time of precipitation of the desired lead compound. Otherwise, the complex lead sodium chloride formed by dissolving the lead sulfate or chloride in the brine is likely to crystallize out and contaminate the product. Washing of the precipitate with water will not readily remove this entrapped salt, so that it may serve as a source of contaminating chlorine in the final product.

If the sodium chloride brine is used alone, the sodium sulfate may be later removed from the brine by a suitable process, such as by refrigeration or evaporation and crystallization, so that the brine may be again used for treating more ore; yet that procedure involves the disadvantage, aside from the expense, that the sodium sulfate seriously decreases the solvent action of the brine, whereas the efficiency of this process is predicated on the use of strong or concentrated reagent solutions. That particular difficulty is overcome by employing a brine which comprises an alkaline earth metal chloride, i. e. the chloride of calcium, barium or strontium, wherein the latter is present in amount sufficient to precipitate substantially all of the sulfate radical as alkaline earth metal sulfate. An aqueous brine of sodium and calcium chlorides is preferred, and this brine may be made by combining a 40° Bé. solution of $CaCl_2$ with a 90% saturated NaCl solution, both of which are substantially free from magnesium chloride and other undesired materials. This high concentration of $CaCl_2$ prevents dilution of the NaCl leaching brine. The calcium chloride in the salt brine thus removes the sulfate ions and so makes it possible to dissolve a large amount of lead, which may be about 50 grams of soluble lead content per liter of sodium chloride brine. Any lead chloride in the ore residue will be dissolved along with the lead sulfate in the hot concentrated brine. The precipitated calcium sulfate remains with the ore residue at the end of a leaching operation. If the pulverized ore material is treated with the brine in an agitating tank, then a suitable filtering operation will follow this procedure for separating the residue and calcium sulfate from the lead bearing brine.

The ore residue may contain various undesired materials, such as iron, manganese, cadmium, etc.; and at this stage, it is desirable to purify the brine while it is hot, so that these impurities will not be precipitated with the lead and require removal at later stages. Various suitable steps may be taken in accordance with prior art practice for removing the impurities. For example, potassium permanganate and alkali metal carbonate may be used to oxidize the ferrous iron and precipitate iron and manganese as ferric hydroxide and manganese dioxide which are removed by filtration. The copper and silver may thereafter be removed as insoluble sulfides by means of sodium sulfide, and various other well known reagents may be adopted for this general purpose. To prevent precipitation of the lead sodium chloride from the hot brine, the latter is preferably heated through a few degrees prior to the purification step to render it unsaturated. If the brine was originally at 75° C., it may be raised to 80° or more for both the purification and the lead precipitation stages.

The precipitation of the lead from this hot concentrated brine, after the impurities have been separated by filtration, is accomplished by means of the hydroxide of an alkaline earth metal, such as calcium, barium and strontium, and particularly by means of calcium hydroxide or an aqueous lime suspension. The magnesium compounds are not desired in this process. In the preferred practice, an aqueous lime suspension is added to the brine and the mixture further heated, if desired, until the desired precipitation has been accomplished. By this step, the calcium hydroxide is converted to calcium chloride and the lead is precipated as lead hydroxychloride, which is presumed to have the molecular formula of $Pb(OH)_2 \cdot PbCl_2$. It is to be understood that this and the later steps may be employed with lead alkali metal chloride brines derived from other sources besides the sulfate ore as above described and that if lead chloride free from lead sulfate is dissolved in a salt brine, the alkaline earth metal chloride will not be needed. Other modifications will be readily apparent.

The brine containing the sodium and calcium chlorides may then be filtered or otherwise separated from the precipitate without dilution and is therefore in condition for returning to the process for dissolving more of the lead salts from the ore material. The calcium chloride thus returned makes up 50% of the requirements in the ore leaching operation and it is therefore necessary merely to add the other 50% to the brine for the next leaching step, as well as to adjust the concentration of the NaCl and insure that the brine is of required purity.

If no zinc is present in the lead salt brine, then sufficient lime may be added until the pulp is alkaline and contains no soluble lead. If zinc, which may be present as a chloride, has not been previously removed, then it is desirable that the lead salt remain in excess. If the pulp at the end of the lime precipitation step is not alkaline and the solution contains at least 1.5 grams of soluble lead content per liter of brine, the lead precipitate will contain little or no zinc. This zinc content will be less than 0.25% if only 97% of the lead is precipitated from its concentrated solution containing some 50 grams per liter.

This precipitation step may be carried out in various ways. For example, the aqueous lime suspension may be added until the pulp is distinctly alkaline as shown by phenolphthalein as an indicator. Thereafter, a sufficient amount of the lead bearing salt brine may be added until the alkalinity is removed and the pulp contains at least 1.5 grams of the soluble lead content per liter. Another method involves adding the calculated amount of lime to precipitate the desired amount of lead and not permit the pulp to become alkaline at all. During the precipitation, the pulp should be vigorously agitated and the temperature maintained at that point at which the sodium lead chloride will not be precipitated, such as 5 to 10° C. above the temperature of the brine used to dissolve the lead as a saturated solution. After the precipitate has been separated from the resultant solution, the latter may be treated with a little milk of lime or sodium carbonate to precipitate the small amount of dissolved lead and zinc remaining therein, which may be thus recovered for any desired purpose.

An important feature of this invention resides in the type of lime reagent which may be employed and the manner of using the same. The solubility of lead sulfate in sodium chloride brine is only about 50 grams per liter, and a 5% dilution of this brine by any means whatsoever would mean that one ton of water would have to be evaporated for each ton of lead dissolved, if the brine were to be kept in its concentrated condition for further use in a cyclic process. If, therefore, the ordinary milk of lime is suspended in water when added to the lead bearing salt brine, this would dilute the brine materially and so entail evaporation of water from the brine in order to restore its solvent ability for a subsequent step. Therefore, instead of using water as the medium for suspending the hydrated calcium oxide, a strong salt brine of alkaline metal chloride is employed; so that when the lime in its brine is combined with the salt brine the latter is not materially diluted. The preferred method is to add fresh calcium oxide to a concentrated aqueous solution of an alkaline metal chloride, such as sodium or calcium chloride, and particularly sodium chloride. This serves to form a suspension of lime in a concentrated salt brine, or one of substantially the same concentration as that of the brine in which the lead salt is dissolved. Hence the addition of the lime brine to the lead bearing brine does not dilute the latter. This pulp of lime and salt brine initially comprises calcium oxide in suspension which slakes and forms calcium hydroxide in suspension and the latter goes into solution during the step of precipitating the lead hydroxychloride. When lump lime, as derived by calcining or burning limestone by standard procedure, is treated with salt brine to make this reagent, the resultant product may contain small particles of unburned lime and extraneous matter which would contaminate the lead precipitate. Hence, it is desirable to pass this lime brine through a screen, preferably as fine as 150 meshes per linear inch, to remove the calcium carbonate and such other large particles as are to be eliminated. By this procedure, it is possible to produce a lead hydroxyl compound which is substantially free from both lime and zinc.

After the strong brine has been removed from the lead hydroxychloride, as by means of a filter, the precipitate is re-pulped in water and washed to remove such salt as is thus readily separated therefrom. The washing step will readily remove any soluble lime, so that the finished product will contain only from a trace up to 0.04% of CaO content. If solid particles of lime or the hydroxide are present in the lime brine and so increase the CaO content in the pulp, this may be solubilized or reduced to a harmless amount by treating the lead hydroxychloride pulp with hydrochloric acid in excess of the theoretical amount required.

The lead hydroxychloride may be used in various ways, but if a satisfactory litharge is to be derived therefrom, it is necessary that the chlorine be almost completely removed. To this end, the process is so carried on as to convert the lead into a lead carbonate, such as the neutral lead carbonate or the basic product lead hydroxycarbonate, herein termed lead carbonates, and either of these compounds is then calcined to form the litharge. The lead hydroxychloride pulp in water, which is now at room temperature, may be treated with various types of carbonating reagents but the preferred reagent comprises alkali metal carbonate which may be used in accordance with either of the following procedures for making the lead carbonates.

According to the first procedure, the pulp in water is rapidly agitated in a tank for 30 minutes or more with the required amount of alkali metal carbonate, and preferably sodium carbonate, or any suitable compound containing the same, such as trona of required purification. The sodium carbonate may be added to the water suspension of the lead compound as a solid, but preferably as a strong solution, and in amount calculated in accordance with stoichiometric requirements. A slight excess of the reagent, such as 1 or 2%, may be used. During this same agitating period, carbon dioxide gas from a suitable source, such as the later calcination stage, is passed into the pulp and thus aids in converting the hydroxyl content of the material to carbonate if $PbCO_3$ is desired. White lead may be made by suitably proportioning the ingredients and stopping the reaction when analysis shows approximately two parts of carbonate to one of hydroxyl in the product. If lead oxide is to be made, the carbonation step need go no farther than to remove the chlorine from the lead hydroxychloride and form lead hydroxycarbonate, which upon calcination will give up its hydroxyl content as well as carbon dioxide and so form PbO. Thereby, the two reagents serve to convert the lead hydroxychloride to lead carbonate of the required composition. This reaction is so complete that the insoluble chlorine content of the lead carbonate thus formed will not exceed 0.03%, calculated on the dry basis. It will be observed that there is no lime present during this carbonating step and that the reaction is one of converting the lead hydroxychloride precipitate directly to lead carbonate. The process may be suitably modified and the reactions controlled, as will be understood by one skilled in the art. After the lead carbonate has been thus formed it may be separated from the solution, as by filtration, and washed with water to remove some of the sodium carbonate and chloride; and then it is dried for the calcination operation to make litharge or other lead oxide therefrom. It will, of course, be understood that the lead carbonate is usable as such, without being converted to the oxide.

The second procedure comprises treating the pulp in water with the sesquicarbonate of soda proportioned according to the following equation:

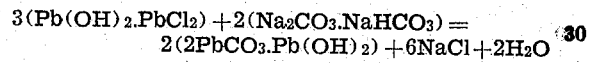

$$3(Pb(OH)_2.PbCl_2) + 2(Na_2CO_3.NaHCO_3) = 2(2PbCO_3.Pb(OH)_2) + 6NaCl + 2H_2O$$

This reaction takes place at room temperature or higher and will result in the production of a satisfactory quality of white lead which, when thoroughly washed, will be practically free from chlorine and contain not over 0.02% thereof. Trona which has been suitably treated for the purpose may be employed in this precipitation step. The carbonate may be in a slight excess and the reagents will be thoroughly agitated during the conversion. The rates of adding the reagents in either of these carbonating procedures may be controlled as desired to give the intended results. The conversion is preferably carried out with a dilute solution, hence washing problems are avoided. The pigmenting properties and composition of the lead hydroxycarbonate may be varied by changing the amounts of the reagents, but it is preferred to keep close to the proportions of hydroxyl and carbonate set forth in the above formula. If desired, the salt derived from the carbonating steps may be returned to the ore leaching stage, but preferably undiluted by the wash water.

The color of white lead is affected by various factors, some of which are internal and dependent upon the process itself. The external factors are impurities, such as iron, which have not been removed from the brine during the purification step, or organic matter which has crept into the material. Even if the external factors are eliminated, there may still remain a yellow color which, it is believed, is due to the presence of some form of lead oxychloride, it being noted that one of these chlorides, known as Cassel yellow, has the formula of $PbCl_2.7PbO$. Whether or not such a contaminating oxychloride is the source of discoloration and chlorine in the final product, it nevertheless is found that by treating the white lead with sodium hydroxide, this color is improved and that it is thereafter possible to remove the residual chloride more readily during a subsequent washing operation. This sodium hydroxide can be added as soon as the white lead has been precipitated and the reaction allowed to stabilize or after the stabilized precipitate has been removed from its solution and repulped in water. The latter procedure is preferred. The quantity of sodium hydroxide to be added will, of course, depend upon the degree of discoloration and the result desired. Only a slight amount is ordinarily needed. Ammonium or potassium hydroxide may be substituted for or added to the sodium hydroxide for the same purpose. After the white lead has thus been purified and suitably washed, it may then be dried and subjected to the calcination steps for conversion to litharge or other lead oxide, or the white lead may be used as such for a pigment or other suitable purposes.

In order to make litharge from the lead carbonate as made by the processes above described, the material may first be calcined at a low temperature, such as a little above 315° C. but below 550° C., to form litharge of a light and fluffy condition and low density. A low calcining temperature makes it unnecessary to grind the lead oxide before washing. The double salt of lead and sodium chloride is likely to appear in the product because of the fact that highly concentrated solutions of the reagents were initially employed during the precipitation step and some may have been occluded or entrapped within the large masses of the precipitated particles. This calcination step not only serves to remove the hydroxyl and carbonate portions of the compound and form lead oxide, but it also decomposes the complex salt that has not been previously washed from the precipitate and forms soluble salts. The calcination may be carried on in a neutral or an oxidizing atmosphere so as to drive off the water and carbon dioxide gas and to form the porous lead oxide.

After the material has been suitably calcined, the litharge is washed in water with considerable agitation and with the water preferably at a temperature of 75° C. so as to insure that any lead chloride as well as other soluble salts present will be dissolved therein. By decanting the solution from the lead oxides, these various soluble compounds, such as sodium carbonate and chloride, are thus removed from the litharge. If the material is still alkaline after washing it, this alkalinity may be neutralized with a slight amount of acid, such as less than 1% of nitric or acetic acid, or a suitable salt, such as lead nitrate or acetate, after which the material is again calcined to obtain litharge of a required density. The density of the litharge may be varied from 15 to 32 or more grams per cubic inch by this second calcination, which may be carried on at a temperature of 600 to 900° C. in a neutral or oxidizing atmosphere. The lead oxide may also be converted to red lead by heating it under controlled temperature conditions below 500° C. and in a current of hot air which provides a sufficient oxygen for the purpose.

In this process of extracting lead from an ore material and producing lead carbonate and litharge, various fundamental requirements have been satisfied. In particular, the solvent action of the brine for lead sulfate has been maintained and the brine has been used cyclically, without involving an expensive procedure for evaporating large quantities of water from the brine or serious contamination thereof. In fact, this ability to keep the brine hot, concentrated and pure is a highly important factor. The process depends for its efficiency and economy of operation upon employing concentrated solutions of the reagents for the various precipitation stages, although their use tends to result in salts being occluded or entrained within the precipitates. The advantages derived from using the strong solutions and excesses of various reagents more than offset the difficulties found in removing the reagent salts from the precipitates. The purification steps above described are therefore of primary importance. It will also be appreciated that by removing iron, etc. from the brine immediately after dissolving the lead sulfate from the ore material, these undesired metals will not be precipitated with the lead carbonate and so do not present the serious problem of removing them from the final product. It is important that the brine be purified at this particular stage. By this procedure, litharge may be derived from a lead bearing brine by intermediate steps involving the use of lime and the formation of lead hydroxychloride and yet the final product will analyze not over 0.04% of CaO, 0.02% of $Cl_2$ and 0.001% of alkali. Many other advantages in the process will be apparent in view of the above disclosure.

I claim:

1. The method of treating an ore material containing a compound of the group consisting of lead sulfate and lead chloride comprising the steps of dissolving the lead salt in a hot aqueous brine of alkaline metal chloride, treating the hot solution with an aqueous brine of alkaline metal chloride to which calcium oxide has been added to form a lime brine suspension, and thereby precipitating lead hydroxychloride, separating the brine from the precipitate and returning the brine for dissolving more of the lead compound.

2. The method of treating an ore material containing a compound of the group consisting of lead sulfate and lead chloride comprising the steps of dissolving the lead salt in a hot aqueous brine of alkaline metal chloride, treating the solution at a temperature at which the solutes remain in solution with an aqueous brine of alkali metal chloride of substantially the same concentration as the other brine and to which calcium oxide has been added to form a lime brine suspension, and thereby precipitating lead hydroxychloride, separating the brine from the precipitate without dilution thereof and returning the brine for dissolving more of the lead compound.

3. The method of treating an ore material containing lead sulfate comprising the steps of dissolving the lead sulfate in a hot aqueous concentrated brine of alkali metal and alkaline earth metal chlorides and forming a concentrated solution of lead salt, while precipitating the sulfate radical as an alkaline earth metal sulfate, removing the precipitate from the solution, thereafter treating the resultant brine with an aqueous alkali metal chloride solution of high concentration in which calcium oxide has been suspended and thereby precipitating lead hydroxychloride, separating the precipitate from the brine without material dilution of the latter and returning the brine for dissolving more lead sulfate of the ore material.

4. The method according to claim 1 wherein the lime brine suspension is formed by adding calcium oxide to a concentrated alkaline metal chloride brine and removing the coarse lumps therefrom.

5. The method according to claim 2 in which each of the brines comprises aqueous sodium chloride solutions of substantially the same concentration and the lead bearing brine is maintained at a temperature of about 75° to 90° C.

prior to the precipitation of the lead hydroxychloride.

6. The method according to claim 2 in which the lead compound is dissolved in an aqueous sodium chloride brine and the precipitating reagent is formed by suspending calcium oxide in a sodium chloride brine of substantially the same concentration as the other brine and in which the calcium oxide content is added in amount insufficient for precipitating all of the lead ions from solution.

7. The method of making lead carbonate from an ore material containing a lead compound of the group consisting of lead sulfate and lead chloride comprising the steps of dissolving the lead compound from the ore material by means of a hot concentrated alkali metal chloride brine, treating the hot lead bearing concentrated brine with an aqueous brine of alkali metal chloride to which calcium oxide has been added in amount substantially sufficient to precipitate the lead ions as lead hydroxychloride, removing the precipitate from the brine, returning the brine without dilution for dissolving more lead compound subsequently treating the precipitate in water suspension with a reagent providing the carbonate radical to form lead carbonate therefrom, and recovering the latter.

8. The method according to claim 7 in which sodium chloride brines of substantially the same concentration are employed for the two reagent solvents and in which the carbonating agent comprises alkali metal carbonate.

9. The method of making white lead comprising the steps of claim 1 and thereafter treating the lead hydroxychloride in water suspension with sodium sesqui-carbonate in amount sufficient to convert the lead compound to white lead of desired composition and properties.

10. The method according to claim 1 comprising the further steps of washing and pulping the lead hydroxychloride precipitate in water, conditioning it with hydrochloric acid to remove any lime therein, and thereafter treating the precipitate with a carbonating agent comprising alkali metal carbonate and carbon dioxide to convert the precipitate to lead carbonate of required composition.

11. The method according to claim 7 in which the lime brine is first added in excess to the lead bearing brine until the pulp of lead precipitate and brine is alkaline, after which a further amount of the lead bearing salt brine is added to provide a pulp containing at least 1.5 grams of dissolved lead salt per liter of solution.

12. The method according to claim 7 in which the lead hydroxycarbonate is removed from the resultant solution and thereafter washed with water and then treated with alkali metal hydroxide to remove discoloration from the lead hydroxycarbonate.

13. The method of making a lead compound from an ore material containing lead sulfate comprising the steps of dissolving the lead sulfate in a hot concentrated sodium chloride brine containing calcium chloride in amount sufficient to precipitate the sulfate radical as calcium sulfate, separating the hot brine from the precipitate, thereafter treating the lead bearing brine with a sodium chloride brine of substantially the same concentration as the other in which has been suspended calcium oxide in amount sufficient to precipitate substantially all of the lead ions, but maintaining the lead salt in a slight excess, and thereby precipitating lead hydroxychloride substantially free from lime, removing the precipitate from the brine, returning the brine for dissolving a further amount of lead sulfate suspending the precipitate in water and treating it with sodium carbonate in excess and carbon dioxide to form lead hydroxycarbonate, and recovering the latter.

ROYAL L. SESSIONS.